(12) United States Patent
Viviani (10) Patent No.: US 10,029,708 B2
(45) Date of Patent: Jul. 24, 2018

(54) AUTONOMOUS RAILROAD MONITORING AND INSPECTION DEVICE

(71) Applicant: Gary Viviani, Lyle, WA (US)

(72) Inventor: Gary Viviani, Lyle, WA (US)

(*) Notice: Subject to any disclaimer, the term of this patent is extended or adjusted under 35 U.S.C. 154(b) by 329 days.

(21) Appl. No.: 15/133,671

(22) Filed: Apr. 20, 2016

(65) Prior Publication Data

US 2017/0305442 A1    Oct. 26, 2017

(51) Int. Cl.
| | |
|---|---|
| *B61D 15/12* | (2006.01) |
| *B61L 23/04* | (2006.01) |
| *B61L 23/14* | (2006.01) |
| *B61L 25/02* | (2006.01) |
| *G01S 13/93* | (2006.01) |
| *G06K 9/00* | (2006.01) |
| *G06T 7/00* | (2017.01) |

(52) U.S. Cl.
CPC ............ *B61D 15/12* (2013.01); *B61L 23/041* (2013.01); *B61L 23/042* (2013.01); *B61L 23/14* (2013.01); *B61L 25/021* (2013.01); *B61L 25/025* (2013.01); *G01S 13/931* (2013.01); *G06K 9/00805* (2013.01); *G06T 7/004* (2013.01); *G01S 2013/9328* (2013.01)

(58) Field of Classification Search
CPC ..... B61D 15/12; B61L 23/041; B61L 23/042; B61L 23/14; B61L 25/021; B61L 25/025
See application file for complete search history.

(56) References Cited

U.S. PATENT DOCUMENTS

| | | | | |
|---|---|---|---|---|
| 5,331,745 | A * | 7/1994 | Jager ................. | E01B 35/00 180/169 |
| 5,893,043 | A * | 4/1999 | Moehlenbrink ........ | B61L 3/004 246/182 C |
| 7,081,824 | B2 * | 7/2006 | Gilbert ................. | B61K 9/08 33/285 |
| 8,720,345 | B1 * | 5/2014 | English ................. | B61F 19/02 105/141 |
| 9,810,533 | B2 * | 11/2017 | Fosburgh ............. | G01C 7/04 |
| 2005/0125113 | A1 * | 6/2005 | Wheeler ............... | B61L 3/127 701/19 |
| 2010/0026551 | A1 * | 2/2010 | Szwilski .............. | B61K 9/08 342/22 |
| 2012/0274772 | A1 * | 11/2012 | Fosburgh ............. | B61K 9/08 348/149 |
| 2014/0218482 | A1 * | 8/2014 | Prince ................. | H04N 7/181 348/47 |

(Continued)

*Primary Examiner* — Jason C Smith
(74) *Attorney, Agent, or Firm* — Mohr Intellectual Property Law Solutions, P.C.

(57) ABSTRACT

In one embodiment, a railroad scout vehicle system includes a scout vehicle and a processing unit. The scout vehicle may include at least two wheels configured to engage a set of railroad tracks, a motor mechanically coupled to at least one of the wheels, a speed controller, an electromagnetic sensor aimed at the set of railroad tracks, a positioning receiver, a local speed sensing device and a transceiver. The speed controller may be coupled to the motor and configured to control the speed of the scout vehicle in order to maintain an appropriate distance between the scout vehicle and a train traveling behind. The processing unit may be configured to transmit the track status information via the transceiver, receive train speed and position signals from the train via the transceiver.

20 Claims, 5 Drawing Sheets

(56) References Cited

U.S. PATENT DOCUMENTS

| | | | | |
|---|---|---|---|---|
| 2014/0247356 A1* | 9/2014 | Forni et al. | ............ | B61L 23/041 348/148 |
| 2015/0314796 A1* | 11/2015 | Maeyama | ............... | B61B 13/04 701/19 |
| 2015/0375765 A1* | 12/2015 | Mustard | .................. | B61L 99/00 701/19 |
| 2016/0368510 A1* | 12/2016 | Simon | .................... | B61D 15/12 |

\* cited by examiner

AUTONOMOUS RAILROAD MONITORING AND INSPECTION DEVICE

BACKGROUND

The present disclosure relates generally to train track inspection and monitoring systems. In particular, the apparatus described provides for autonomous continuous remote inspection of train tracks preceding a train that is in motion.

There exists a need to continuously monitor the tracks in order that advanced warning can prevent a train from crashing into an obstruction or else attempting to traverse an unsafe condition. Known systems do not provide sufficient advanced warning of impending hazards to the person that is operating the train.

For the case of the train operating on railroad tracks, the forward path is well established. It cannot vary. Hence, the primary problem is one of detecting undesirable conditions with as much advanced warning as possible. Any method that involves human or electronic sensor emanating directly from the train itself may not provide sufficient warning. Thus, in the case of a train, which cannot stop very quickly, more advanced warning is a critical concern.

SUMMARY OF THE INVENTION

The speed controller may be coupled to the motor and configured to control a speed of the unmanned railroad scout vehicle. The electromagnetic sensor may be configured to collect track status information related to the physical condition of the railroad tracks. The scout vehicle is unmanned. The positioning receiver may be configured to determine a position of the unmanned railroad scout vehicle. The local speed sensing device may be configured to determine a speed of the unmanned railroad scout vehicle. The transceiver may be configured to communicate with a bi-directional communication system of a train. The train may travel on the railroad tracks behind the unmanned railroad scout vehicle The processing unit may be configured to transmit the track status information via the transceiver, receive train speed and position signals from the train via the transceiver, and modulate the speed controller based at least in part on the train speed and position signals.

In one embodiment, the design of the system provides for an autonomous monitoring and inspection capability termed the "railroad scout vehicle," which operates at a specific distance in front of the traveling train, automatically. The autonomous vehicle may automatically inspect the track and the area in front of the track by integrating signals from a combination of sensors that includes one or more sources of electronic feedback such as (ii) acoustic signals, (ii) visual images, (iii) infrared images, (iv) lidar returns as well as (v) radar returns. The primary purpose of these signals is to automatically determine the existence of an obstruction or an irregularity in the track conditions. A continuous display of these signals may be transmitted to the train engineer, so as to provide for a field of view that has much longer range than what is achievable with the unaided human senses, or else sensors that are localized to the locomotive.

In one embodiment, when an adverse situation is sensed by the railroad scout vehicle, a signal may be sent to the following-behind-train in order to provide sufficient warning to allow the train to slow down without incurring a collision or otherwise undesirable encounter (derailment). The person operating the train may receive visual indication of the sensor-based signals. In this regard, the train engineer may make independent decisions regarding the conditions preceding the direction of travel of the train. In one embodiment, the communications link between the railroad scout vehicle and the leading portion of the train may operate in a failsafe manner. In this regard, the system may monitor both the relative speeds and separations of the vehicles. If the communications link is lost or otherwise impaired, the system may trigger a failsafe device on the train, thereby forcing the train to stop forward motion. In one embodiment, the means for sensing hazards may be subject to human evaluation and/or override.

As described above, the train operator is often faced with the impossible situation of observing an object in the path of a train but not having the ability to stop sufficiently fast in order to avoid a collision or else derailment. In addition, there are hazards that the operator may be unable to discern. The disclosed system addresses both these circumstances by inspecting aria monitoring the condition of the tracks at a point that is farther in front than is what is otherwise able to be seen by the operator, even with sensor based augmentation that is local to the locomotive. In this manner, much greater margin of safety and reliability is provided to normal railroad operations.

BRIEF DESCRIPTION OF THE DRAWINGS

For a more complete understanding of the invention, reference is made to the following description and accompanying drawings, in which.

DETAILED DESCRIPTION

In what follows, the terra motor means a device that imparts motion by converting one form of energy to another. In some embodiments, the motor may be an electric motor that converts electrical energy into rotating mechanical motion. In some embodiments, the motor may be a combustion engine, whereby chemically stored energy is converted into the motion of a piston which in turn is utilized for rotating mechanical motion.

In what follows, the term electromagnetic in conjunction with sensors implies an electronic sensor that either absorbs or radiates electromagnetic energy.

In this regard, devices such as electronic cameras over a variety of wavelengths, radar, lidar as well as capacitively coupled devices that are associated with proximity detect (for example) would all be included in the class of electromagnetic sensors.

In what follows, the term speed controller means a device that regulates the speed of rotational movement produced by a motor. In one embodiment, the speed controller may control an electric motor, thus, the speed controller may comprise a variable frequency drive and/or a device to modulate direct current. In other embodiments, the speed controller may control a combustion engine. Thus, in some embodiments, the speed controller may comprise a mechanical transmission. Thus, the speed controller may allow for a variable rate of rotation of the attached wheel, or else wheels, in the case that more than one wheel is attached to a single speed controller.

Figure 1:
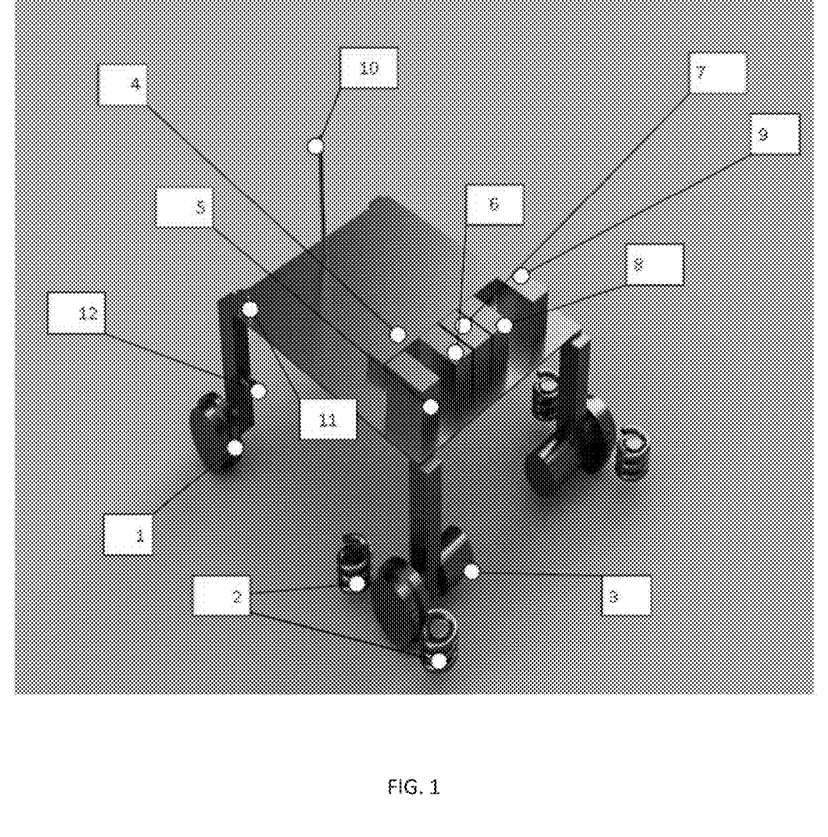
FIG. 1 Overview and Components for the Railroad Scout Vehicle.

FIG. 1 shows one embodiment of a scout vehicle. In FIG. 1, one finds:
(a) The Track Wheel [1],
(b) The Electromagnet [2],
(c) The Motor Drive [3],
(d) The Signal Processing Unit [4],
(e) The Radar Transceiver [5],
(f) The Lidar Transceiver [6],
(g) The Visual Wavelength Streaming Video Camera [7],
(h) The Infra Red Wavelength Streaming Video Camera [8],
(i) The Radio Frequency Transceiver [9],
(j) The Transceiver Link Antenna [10],
(k) The Positioning Receiver combined with optional Distance Measuring Equipment (DME) [11] and,
(l) The Local Speed Sensor Device [12].

The railroad scout vehicle may be an autonomous vehicle, that is self-propelled by virtue of The Track Wheel [1], The Electromagnet [2], and The Motor Drive [3], in a manner that facilitates adherence to the railroad tracks.

The railroad scout vehicle will have at least two wheels that engage a set of railroad tracks.

The Electromagnet [2], located on the front and back of the drive wheels in the illustrated embodiment, is responsible for electromagnetic forces, that facilitate adherence to the tracks. Alternative arrangements are possible.

The Track Wheel [1], in at least one of the four locations, may be attached by a shaft to The Motor Drive [3]. The Motor Drive [3] comprises a motor and speed controller. As described above the speed controller allows for changing the rotational rate of the motor (and hence The Track Wheel [1]).

Each motor may operate at the same number of revolutions as the others, if there is more than one. The speed of the motors may be controlled by The Signal Processing Unit [4] in conjunction with The Positioning Receiver combined with optional Distance Measuring Equipment (DME) [11] and The Local Speed Sensor Device [12]. In one embodiment, The Positioning Receiver may comprise a Global Positioning System (GPS) receiver.

In one embodiment, the system may comprise a single motor attached to all our wheels.

As can be determined by the indicated shape of The Track Wheel [1], the system is designed such that each of all four of The Track Wheel [1](s) remain in essentially constant contact with the railroad track in a manner similar to which a train would adhere to the track.

In the case of the railroad scout vehicle, the weight may be far less than that of a train and hence The Electromagnet [2] associated with at least two of the wheels may be utilized to assure that the vehicle will remain on the track regardless of the speed.

The Electromagnet [2] device that is indicated in FIG. 1 is but one embodiment. In this particular arrangement, the distance between the track and the electromagnet may be controlled to assure sufficient attractive force to the railroad track.

Alternative arrangements of to receive attractive force between The Track [1] and the railroad track are also contemplated. For example, electromagnets or else permanent magnets may be embedded in the circumference of The Trick Wheel [1].

Alternatively, The Electromagnet [2] indicated in FIG. 1 may be replaced with a similarly positioned permanent magnet, as opposed to one that is embedded in the illustrated Track Wheel [1].

Figure 2:
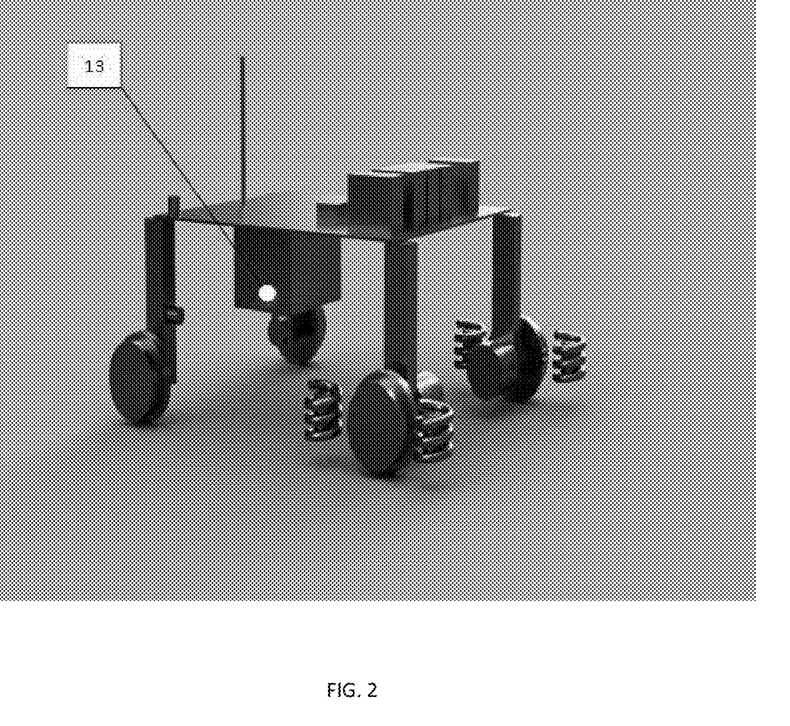
FIG. 2 Alternative View of Railroad Scout Vehicle.

FIG. 2 is the same as FIG. 1 from a slightly different vantage point where one finds:
(a) The Electrical Energy Source [13].

For the illustrated embodiment, The Electrical Energy Source [13] may comprise a combination of both fuel and electrical energy creation, or alternatively, this could represent either a fuel cell or else a battery. The source of electrical energy may be varied as appropriate for the application.

In the case that The Motor Drive [3] comprises a combustion engine, or similar device, The Electrical Energy Source [13] may comprise a fuel source in order to supply The Motor Drive [3].

Additional components which provide autonomous active sensing and measuring capabilities include:
(d) The Signal Processing Unit [4],
(e) The Radar Transceiver [5],
(f) The Lidar Transceiver [6],
(g) The Visual Wavelength Streaming Video Camera [7],
(h) The Infra Red Wavelength Streaming Video Camera [8],
(i) The Radio Frequency Transceiver [9],
(j) The Transceiver Link Antenna [10],
(k) The Global Position Receiver (GPS) combined With optional Distance Measuring Equipment (DME) [11] and,
(l) The Local Speed Sensor Device [12].

Collectively, the preferred embodiment sensors include the following: The Radar Transceiver [5], The Lidar Transceiver [6], The Visual Wavelength Streaming Video Camera [7], The Infra Red Wavelength Streaming Video Camera [8]. These are collectively described as electromagnetic sensors which are configured to collect track status information for the purpose of assessing the condition of the railroad tracks as well as the area surrounding the tracks in order to discern potential hazards or obstacles.

The indicated set of electromagnetic sensors may be augmented for the purpose of assessing the condition of the railroad tracks as well as the area surrounding the tracks in order to discern potential hazards or obstacles.

The illustrated Signal Processing Unit [4] is in control of all these inputs and performs three key functions:
It collects the raw signals and makes over them suitable for transmission The Radio Frequency Transceiver [9] in that one or more of the signals associated with the sensors may be displayed on a console for use by the train personnel.
The video signals may be displayed in a two dimensional, television-like screen format, in order to provide real time video of the field of view (path forward for the train) of the railroad scout vehicle.
These displays represent a straightforward relaying of the sensor data from the forward looking railroad scout vehicle to the train. [0045] Additional sensors that provide more precise indications of the condition of the track, such as, the temperature, rate of rain, wind velocity, etc. are all within the scope of possible deployments.
(i) The Signal Processing Unit [4] evaluates the relative and absolute positions of the railroad scout vehicle and the train in order to modulate the speed of the railroad scout vehicle in order to maintain a constant separation between the train and the railroad scout vehicle.
(ii) The Signal Processing Unit [4] may evaluate the received signals in order to automatically discern if there is a hazard (obstruction) in the path forward of the railroad scout vehicle.

(iii) The Signal Processing Unit [4] will evaluate the received signals in order to automatically discern if there is a hazard (obstruction) behind the railroad scout vehicle.

If an obstruction is automatically detected The Signal Processing Unit [4] will transmit a warning via The Radio Frequency Transceiver [9] in order to signal the train which follows to take immediate corrective action. Corrective action would more than likely be to stop the train.

Figure 3:
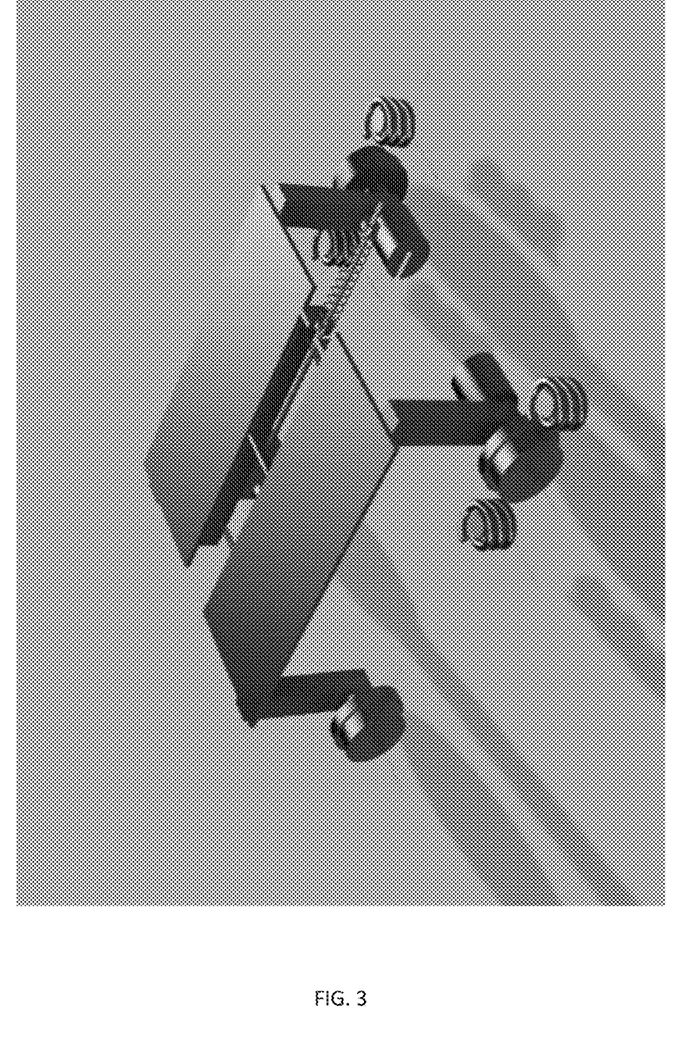
FIG. 3 Overview of Railroad Scout Vehicle Fragmentation Device.
Figure 4:
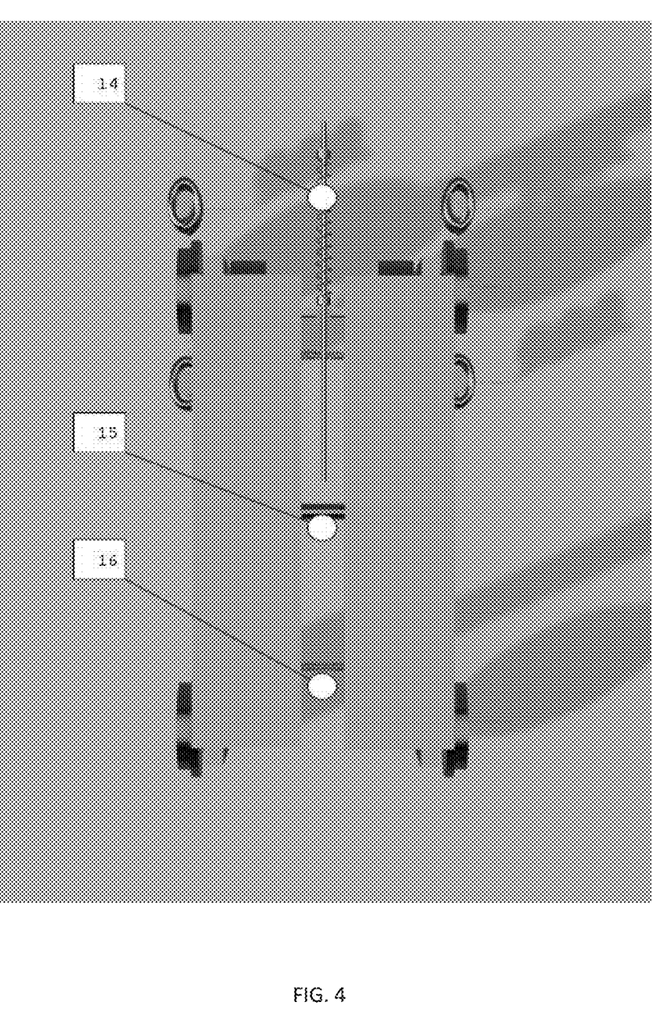
FIG. 4 Top View of Railroad Scout Vehicle Fragmentation Device.

FIG. 3 provides a different view of the railroad scout vehicle where the focus is on the frangibility of the device. FIG. 4 reveals the key details of the means by which the Scout Cart will break apart in the event of a crash with another object. The key components are:

(m) The Damped Spring Ram Device [14],
(n) The Frangible joint [15],
(o) Separation Spring [16].

The Damped Spring Ram Device [14] may be repeated more than once in the preferred embodiment. It would be just as likely to have The Damped Spring Ram Device [14] positioned for impact in both the forward and reverse direction of the railroad scout vehicle.

The Frangible Joint [15] is struck by The Damped Spring Ram Device [14] upon impact.

One or more Separation Spring [16] parts is (are) used to force the railroad scout vehicle elements away from the tracks in the event of a collision where The Frangible Joint [15] is shattered by The Damped Spring Ram Device [14].

In FIG. 3 and FIG. 4 two of the Separation Spring [16] parts are indicated. More or less are possible, according to the weight of the vehicle and the expansion force of each Separation Spring [16].

The frangibility of the railroad scout vehicle adds an extra margin of safety in the event of a potential malfunction. The Scout Cart should only self destruct in the event of a failure and under normal operational conditions it should remain rigid. Such a capability is introduced to insure that a failure in the railroad scout vehicle will not degrade the existing safety margins of the railroad track environment.

Figure 5:
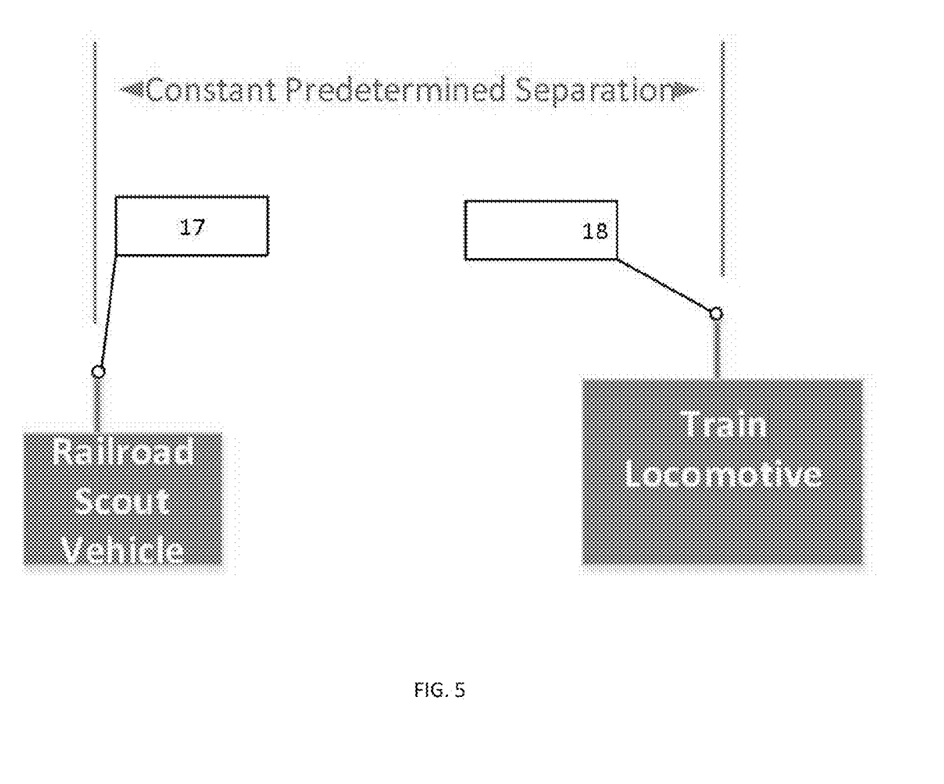
FIG. 5 Constant Separation between Train and Railroad Scout Vehicle.

FIG. 5 includes two key components:
(p) The Scout Vehicle Reference Point Device [17],
(q) The Train Reference Point Device [18].

Both the railroad scout vehicle and the locomotive (train) have on board capabilities for determining, respectively, their local geographical location, speed and velocity. The Scout Vehicle Reference Point Device [17] and The Train Reference Point Device [18] represent these respective capabilities.

With respect to speed and location of either the train or else the railroad scout vehicle, only two possible perspectives are applicable. These are characterized as either "absolute" or else "relative" measurements.

GPS is an example of what is commonly considered to be an absolute measurement. It provides a numerical indication of a specific location in 3 dimensional coordinate system that indicates a specific location in space associated with the GPS receiver.

With the availability of two absolute locations, a relative measurement, which can be thought of as the separation between two absolute locations is possible.

Alternatively a relative position measurement is possible by directly measuring the relative distance between two objects of interest. For example, DME (Distance Measuring Equipment) measures the round trip time of an electromagnetic signal in order to assess the relative distance between two objects. This requires a matched transceiver on both objects and the known propagation characteristics of a signal in a known medium. The typical application involves a transceiver pair operating in earth's atmosphere, such as the distance between an aircraft based transceiver and a ground based one. Electromagnetic signals travel at approximately the speed of light through the atmosphere.

The most important distance measurement with respect to the train and railroad scout vehicle is the relative separation between the two vehicles. This can be determined by either absolute measurements, such as those utilizing GPS or else by relative measurements such as those involving DME.

By either methods involving GPS, or else DME, or possibly both, The Scout Vehicle Reference Point Device [17] and The Train Reference Point Device [18] are continually determined.

The Scout Vehicle Reference Point Device [17] and The Train Reference Point Device [18] may be determined in either units of relative distance and speed measurement, or else absolute distance and speed measurement.

The Scout Vehicle Reference Point Device [17] and The Train Reference Point Device [18] may be determined in both units of relative distance and speed measurement and absolute distance and speed measurement.

In order to determine The Scout Vehicle Reference Point Device [17] and The Train Reference Point Device [18], The Signal Unit [4] may incorporate appropriate estimation algorithms that make use of The Local Speed Sensor Device [12] in combination with either GPS or DME.

In order to determine The Scout Vehicle Reference Point Device [17] and The Train Reference Point Device [18]. The Signal Processing Unit [4] may incorporate appropriate estimation algorithms that make use of The Local Speed Sensor Device [12] in combination with both GPS and DME.

In the case of the railroad scout vehicle, The Signal Processing Unit [4] is responsible for determining position and speed information and sharing it with the locomotive (train) via The Radio Frequency Transceiver [9].

The train has a similar on board capability to determine local speed and position information.

Location and speed information, for both the train and the railroad scout vehicle, is synchronized with the data on The Signal Processing Unit [4]. Synchronization of information can occur in a variety of means but the IEEE 1588 Clock Synchronization Standard represents one method of assuring that information transfer between the railroad scout vehicle and the train is coordinated in a manner that is timely enough to assure accuracy and relevancy of railroad scout vehicle information.

Additionally, if the link should fail, which means the expected updates have failed for a predetermined period, this will result in a failsafe conditions such as stop the train. Hence, the operator of the train will be presented with either accepting or overriding a stop the train signal.

The Signal Processing Unit [4] is combination with the variety of sensors ((e)-(h), (j)-(l) and (p)-(q) also provides for both day and night operations of the railroad scout vehicle.

While it is possible for the railroad scout vehicle to just relay sensory outputs back to the locomotive with The Radio Frequency Transceiver [9], thus allowing those operating the train to simply interpret these signals, it is also important for the railroad scout vehicle to process these signals dependent upon the ambient conditions.

During daylight condition with good visibility the most important information may be determined by The Visual Wavelength Streaming Video Camera [7] in combination with The Radar Transceiver [5] and The Lidar Transceiver [6].

For both daytime and nighttime operations, the field of view of concern is primarily limited to the space a few hundred feet in front (or behind) of the railroad scout vehicle and directly on and above the railroad tracks. For example, The Radar Transceiver [5] can be used to peer directly in front (or behind) of the path of the railroad scout vehicle in order to determine if there are obstructions such a large rock, vehicle, animal etc.

The Visual Wavelength Streaming Video Camera [7] can be used to determine the condition of the tracks themselves in order to discern non-parallel track conditions which could lead to derailment.

As visibility conditions change, such as during night operations, or else in more adverse weather conditions, the means for combining sensory information will have to change. For example, while The Radar Transceiver [5] may still be effective in rain and at night, The Lidar Transceiver [6] may not work so well if atmospheric conditions cause too much scattering.

During night operations the images from The Visual Wavelength Streaming Video Camera [7] may be replaced with those from The Infra Red Wavelength Streaming Video Camera [8] instead. Alternately, it may be advantageous to combine both The Visual Wavelength Streaming Video Camera [7] and The infra Red Wavelength Streaming Video Camera [8].

For whatever ambient and variable conditions exist, The Signal Processing Unit [4] may adjust the means by which potential hazards are assessed, automatically. Even though the raw sensory information is continued to be transmitted to the locomotive, the means for assessing the hazard potential will constantly be electronically optimized in order to account for the ambient environmental conditions of the railroad scout vehicle. In this manner, the probability detecting a hazard is maximized.

In one embodiment, the interaction between The Signal Processing Unit [4] and the variety of sensors variety of sensors ((e)-(h), (j)-(l) and (p)-(q)) may be configured via parameters determined by the operational staff.

The desired forward looking range for the railroad scout vehicle will allow for some likely adjustments to The Lidar Transceiver [6] and The Radar Transceiver [5] settings. Characteristically, the sensitivity of the device will vary as a function of these settings and these decisions will be made by the operational staff.

The decisions regarding proper settings will likely be a function of the known ambient operational conditions.

In some embodiments The Visual Wavelength Streaming Video Camera [7] and The Infra Red Wavelength Streaming Video Camera [8] in conjunction with The Signal Processing Unit [4] may perform pertinent image processing.

With regard to image processing, due to limits on computational abilities, a choice of algorithm may be necessitated. For example, one likely algorithm would be one determines the separation between the railroad ("parallelness" of the) tracks and confirm that they are of uniform gauge.

Alternatively, the image processing may instead focus on errant crossties, or else poor quality welds at the joints.

Depending upon the available processing power of The Signal Processing Unit [4] or else localized computational abilities of The Visual Wavelength Streaming Video Camera [7] or The Infra Red Wavelength Streaming Video Camera [8], it may be necessary to limit the types of hazards that can be considered simultaneously. These settings may be made by the operational personal according to the expected operational conditions.

Ideally, it would be possible to scan for all known hazards, all the time. Ongoing improvements in functionality of the electronics of the railroad scout vehicle would be expected in order to achieve this ultimate objective.

The invention claimed is:

1. A railroad scout vehicle system comprising:
(a) a scout vehicle comprising:
at least two wheels configured to engage a set of railroad tracks;
a motor mechanically coupled to at least one of the wheels;
a speed controller coupled to the motor and configured to control a speed of the railroad scout vehicle;
an electromagnetic sensor aimed at the set of railroad tracks, the electromagnetic sensor configured to collect track status information related to the physical condition of the railroad tracks;
a positioning receiver configured to determine a position of the railroad scout vehicle;
a local speed sensing device configured to determine a speed of the railroad scout vehicle;
a transceiver configured to communicate with a bi-directional communication system of a train, the train traveling on the railroad tracks behind the railroad scout vehicle;
wherein the scout vehicle is unmanned; and
(b) a processing unit configured to:
transmit the track status information via the transceiver;
receive gain speed and position signals from the train via the transceiver; and
modulate the speed controller based at least in part on the train speed and position signals.

2. The railroad scout vehicle system of claim 1, comprising:
a train operator interface system comprising a display configured to display the track status information.

3. The railroad scout vehicle system of claim 1, wherein the processor is configured to:
process the track status information to determine a hazard comprising at least one of:
the presence of an object on the tracks; and
damage to the tracks;
and to generate an alarm in response to detection a hazard;
wherein the system comprises:
an automatic train arrestor system configured to trigger brakes of the train response to the track status information.

4. The railroad scout vehicle system of claim 1, wherein the electromagnetic sensor comprises a camera, and wherein the track status information comprises a series of images obtained via the camera, each image including portion of the railroad tracks.

5. The railroad scout vehicle system of claim 4, comprising an image processor configured to:
receive a least some of the series of images; and
analyze the received images to determine the distance between the pair of railroad tracks;
compare the distance to a predetermined range of values; and
transmit an alarm when distance falls outside the predetermined range.

6. The railroad scout vehicle system of claim 1, wherein the local speed sensing device determines the speed of the scout vehicle based at least part on input from the positioning receiver.

7. The railroad scout vehicle system of claim 1, wherein the scout comprises:

a chassis; and a frangible joint system, wherein the frangible joint system comprises:
    a potential energy storage device;
    a predetermined joint in the chassis; and
    a trigger mechanism configured to force the predetermined joint apart via energy stored in the potential energy storage device.

8. The railroad scout vehicle system of claim 7, wherein the potential energy storage device comprises a spring.

9. The railroad scout vehicle system of claim 7, wherein the trigger mechanism is a spring-damped ram device.

10. The railroad scout vehicle system of claim 7, wherein the predetermined joint is integrated into the chassis to be essentially parallel to a direction of travel of the scout vehicle on the tracks.

11. The railroad scout vehicle system of claim 10, wherein, when triggered, the frangible joint system is configured to separate the railroad scout vehicle into two pieces and force the two pieces away from the tracks in generally opposite directions.

12. The railroad scout vehicle system of claim 1, comprising air electro magnet mounted to the scout vehicle and configured to bias the wheels into contact with the tracks.

13. A method of monitoring a set of railroad tracks, the method comprising:
(a) collecting track status information related to the physical condition of the tracks via an electromagnetic sensor, the electromagnetic sensor being mounted on an unmanned scout vehicle, the scout vehicle comprising:
    at least two wheels configured to engage the tracks;
    a motor mechanically coupled to at least one of the wheels;
    a speed controller coupled to the motor and configured to control a speed of the unmanned railroad scout vehicle;
    a positioning receiver configured to determine a position of the unmanned railroad scout vehicle;
    a local speed sensing device configured to determine a speed of the unmanned railroad scout vehicle;
    a transceiver configured to communicate with a bi-directional communication system of a train, the train traveling on the railroad tracks behind the unmanned railroad scout vehicle;
(b) transmitting the track status information to the train via the transceiver;
(c) receiving train speed and position signals from the train via the transceiver; and
(d) modulating the speed controller based at least in part on the train speed and position signals.

14. The method of claim 13, comprising:
displaying the track status information to an operator on the train.

15. The method of claim 13, wherein the electromagnetic sensor comprises a camera, and wherein the collecting track status information step (a) comprises:
obtaining series of images of the tracks via the camera.

16. The method of claim 15 comprising:
detecting hazards in at least one of the images, wherein the detecting comprises:
    comparing a long axis of one of the tracks in the image to a long axis of the other track in the image to search for track damage;
    scanning the surface of the tracks for foreign objects.

17. The method of claim 16, comprising generating an alarm signal in response to detection of a hazard.

18. The method of claim 17, comprising automatically triggering brakes of the train in response to the alarm signal.

19. The method of claim 13, comprising biasing the wheels into contact with the tracks via an electro magnet mounted to the scout vehicle.

20. The method of claim 13 comprising:
contacting a trigger mechanism of a frangible joint system of the scout vehicle with the train;
separating the railroad scout vehicle into two pieces; and
forcing the two pieces away from the tracks in generally opposite directions.

* * * * *